(12) United States Patent
Talwar et al.

(10) Patent No.: US 7,278,139 B2
(45) Date of Patent: *Oct. 2, 2007

(54) EMULATION CLASS REVISION SYSTEM AND METHOD

(75) Inventors: Vanish Talwar, Mountain View, CA (US); Dongni Chen, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 776 days.

This patent is subject to a terminal disclaimer.

(21) Appl. No.: 10/438,650

(22) Filed: May 14, 2003

(65) Prior Publication Data

US 2004/0230948 A1 Nov. 18, 2004

(51) Int. Cl.
*G06F 9/44* (2006.01)
*G06F 9/45* (2006.01)

(52) U.S. Cl. .................. 717/168; 717/166; 719/331; 719/332

(58) Field of Classification Search ............. 717/166, 717/168; 719/331, 332
See application file for complete search history.

(56) References Cited

U.S. PATENT DOCUMENTS

| | | | | |
|---|---|---|---|---|
| 5,303,379 A | * | 4/1994 | Khoyi et al. | 717/166 |
| 6,023,704 A | * | 2/2000 | Gerard et al. | 707/103 R |
| 6,347,396 B1 | * | 2/2002 | Gard et al. | 717/168 |
| 6,823,504 B1 | * | 11/2004 | Sokolov | 717/136 |
| 2003/0074487 A1 | * | 4/2003 | Akgul et al. | 709/328 |
| 2003/0191870 A1 | * | 10/2003 | Duggan | 709/331 |

OTHER PUBLICATIONS

Dmitriev, "Safe Class and Data Evolution in Large and Long-Lived Java Applications", Dissertation, University of Glasgow, Mar. 2001, archived Feb. 2002 at the Internet Archive, accessed Sep. 29, 2006 at <http://web.archive.org/web/20020214001715/www.dcs.gla.ac.uk/~misha/papers/>, 208 pages.*

Danielsson et al., "JDRUMS: Java Distributed Run-time Updating Management System", thesis from Växjö University, archived Jun. 2001, at the Internet Archive, accessed Sep. 29, 2006 at <http://web.archive.org/web/20010614184621/http://www.ida.liu.se/~jengu/jdrums/jdrums.pdf>, 104 pages.*

Evans, "Dynamic On-line Object Update in the Grumps System", Computer Software and Applications Conference, 2002. COMPSAC 2002. Proceedings. 26th Annual International, pp. 994-999.*

J. Andersson and T. Ritzau. Dynamic code update in JDrums. In Proceedings of the ICSE'00 Workshop on Software Engineering for Wearable and Pervasive Computing, Limerick, Ireland, 2000, <http://citeseer.ist.psu.edu/article/andersson00dynamic.html>.*

(Continued)

*Primary Examiner*—Tuan Dam
*Assistant Examiner*—J. Derek Rutten

(57) ABSTRACT

A present invention emulation class revision process performs emulation class revisions. In one embodiment of the present invention an indication of an emulation class revision initiation is received. A safe state for performing the emulation class revision is established. In one exemplary implementation the safe state retains prior processing results. An emulation class revision is performed.

19 Claims, 5 Drawing Sheets

OTHER PUBLICATIONS

Andersson et al., "Run-time Support for Dynamic Java Architectures", In Proceedings of the ECOOP'98 workshop on Object-Oriented Software Architectures, 1998. Technical report 13/98 University of Karkskrona/Ronneby.*

Welch, I., Stroud, R.J.: Kava—A Reflective Java Based on Bytecode Rewriting. In Cazzola, W., Stroud, R.J., Tisato, F., eds.: Reflection and Software Engineering. Lecture Notes in Computer Science 1826. Springer-Verlag, Heidelberg, Germany (2000) 155-167.*

* cited by examiner

EMULATION CLASS REVISION SYSTEM AND METHOD

FIELD OF THE INVENTION

The present invention relates to programming devices. More particularly, the present invention relates to revising or updating emulation class (e.g., Java class) information.

BACKGROUND OF THE INVENTION

Electronic systems and circuits have made a significant contribution towards the advancement of modern society and are utilized in a number of applications to achieve advantageous results. Numerous electronic technologies such as digital computers, calculators, audio devices, video equipment, and telephone systems have facilitated increased productivity and reduced costs in analyzing and communicating information in most areas of business, science, education and entertainment. Systems providing these advantageous results often involve emulation of a virtual "machine" for processing information. Emulation application information directing processing activities is often revised or updated for a variety of reasons. However, revising and updating existing emulation application information can be difficult and are often problematic.

Numerous electronic devices include processors that operate by executing programs comprising a series of instructions. These programs and their series of instructions are typically referred to as software. Software instructions include directions that guide processor device functions in the performance of useful tasks. The software code is often expressed in different configurations or languages. Source code is usually expressed in a language at one level and compiled into a different level expression. For example, emulation or virtual language (e.g., Java) source code is typically compiled intobytecode.

There can be significant differences between different types of code expression. Emulation languages (e.g., Java) typically offer flexible programming advantages. Emulation language code is usually more portable and mobile between system platforms than code that is native to a particular single platform. However, native languages usually offer significant potential performance advantages. For example, native languages can usually be optimized for particular system hardware architectures (e.g., an embedded processor) in a manner that significantly increases capability and speed. Native languages also often permit implementation of specialized functionality or features (e.g., utilization of embedded system functionality and features).

Java is one example of a high level emulation language that offers significant advantages over native languages. Java characteristics of platform independence, security, and network mobility make it particularly suitable for emerging distributed network computing environments. A Java program typically runs on a Java platform that interacts with the underlying computer system resources through application program interfaces (APIs). Since there is significant diversity of interfaces available for interacting between a Java program and various underlying operating systems, Java is relatively platform independent. This enables Java to be an effective language for distributed or network environment programming without the need for extensive specialized adaptation to the variety of devices potentially included in a network system. While Java applications can provide significant advantages, revising or updating a Java application in a proper manner can be difficult.

Emulation applications usually have to be revised or updated to address advances in technology and/or provide additional desired features. Revising or updating a Java application can gives rise to a number of potential problems. For example, maintaining data consistency can be a problem when revising a Java application on the fly. Java applications usually have multiple threads running simultaneously in various stages of execution. If the instructions included in a Java application change in the middle of various execution stages, the processed information may not be consistent and can cause erroneous results. The number of times and intervals at which emulation application information (e.g., Java classes) gets updated can vary and often depends on the application type. Some applications involve frequent and numerous updates.

One traditional approach to attempt data consistency or coherency is to shut down an emulation virtual machine before a revision or update to emulation application information is made. For example, Java virtual machines are shut down stopping current application processing and the new classes (e.g., revised classes) are reloaded in place of the old ones. This usually requires the entire application to be loaded again and processing started over. This is particularly inconvenient if the emulation virtual machine has been running an application for a relatively long period of time. The relative nature of the time between revision is usually determined based upon the application. For example, if an application performs numerous operations in a second, several minutes can be a relatively long lived application with respect to application processing. If the emulation virtual machine has been running for a while there can be a significant number of application threads that involve information "reprocessing".

Revision problems can be significant on embedded systems because they typically run for a relatively long time and starting processing over can be redundant and wasteful. For example, in a printer implementation, emulation applications (e.g., a Java application) can run for a significant time and a lot of emulation application information can be loaded in the virtual machine. To revise or update the printer emulation information, the emulation virtual machine (e.g., a Java virtual machine) typically has to be shut down resulting in a loss of processed information. Restarting the emulation virtual machine includes loading the emulation classes and starting the processing over from the beginning. Another example is a handheld device (e.g., a personal digital assistant) which includes emulation applications and the emulation virtual machine is basically the base platform and underlying operating system. Again, shutting down the emulation virtual machine and restarting can involve significant "reprocessing" of information.

SUMMARY OF THE INVENTION

A present invention emulation class revision process performs emulation class revisions. In one embodiment of the present invention an indication of an emulation class revision initiation is received. A safe state for performing the emulation class revision is established. In one exemplary implementation the safe state retains prior processing results. An emulation class revision is performed.

BRIEF DESCRIPTION OF THE DRAWINGS

The accompanying drawings, which are incorporated in and form a part of this specification, illustrate embodiments of the invention by way of example and not by way of limitation. The drawings referred to in this specification should be understood as not being drawn to scale except if specifically noted.

DETAILED DESCRIPTION OF THE INVENTION

Figure 1A:
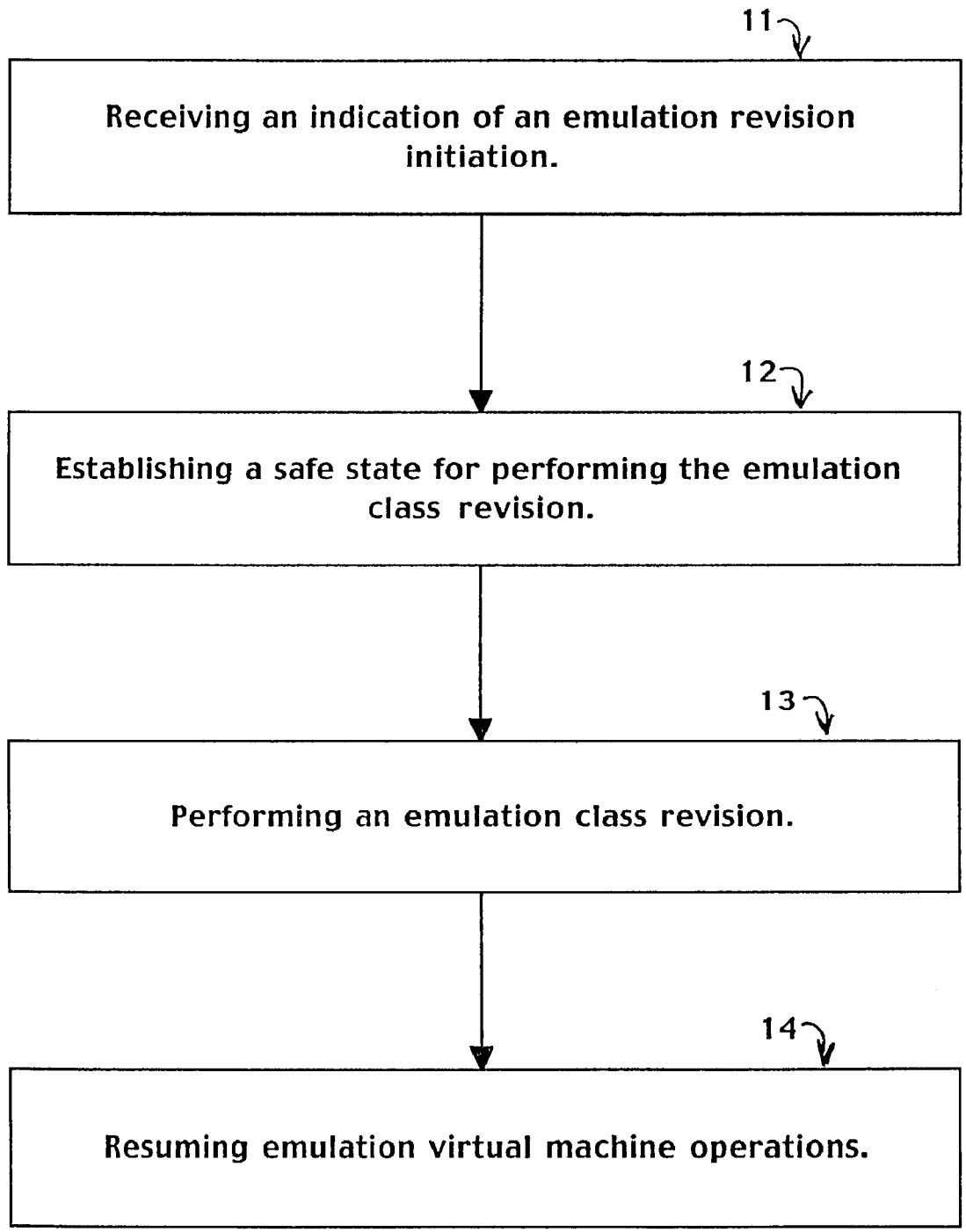
FIG. 1 is a flow chart of an emulation class revision method in accordance with one embodiment of the present invention.
FIG. 1B is a block diagram representation of one embodiment of a present invention emulation application revision architecture.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it is understood the present invention may be practiced without these specific details. In other instances, some readily understood methods, procedures, components, and circuits have not been described in detail as not to unnecessarily obscure aspects of the current invention.

Some portions of the detailed descriptions that follow are presented in terms of procedures, logic blocks, processing, and other symbolic representations of operations on data bits within a computer memory. These descriptions and representations are the means generally used by those skilled in data processing arts to effectively convey the substance of their work to others skilled in the art. A procedure, logic block, process, etc., is here generally conceived to be a sequence of steps or instructions that guide operations of a system to a desired result. The steps include physical manipulations of physical quantities. Usually, though not necessarily, these quantities take the form of electrical, magnetic, optical, or quantum signals capable of being stored, transferred, combined, compared, and otherwise manipulated in a processing system. It has proven convenient at times, principally for reasons of common usage, to refer to these signals as bits, values, elements, symbols, characters, terms, numbers, or the like.

It should be borne in mind, however, that all of these and similar terms are associated with the appropriate physical quantities and are merely convenient labels applied to these quantities. Unless specifically stated otherwise as apparent from the following discussions, it is appreciated that throughout the present application, discussions utilizing terms such as "processing", "computing", "calculating", "determining", "displaying" or the like, refer to the action and processes of a computer system, or similar processing device (e.g., an electrical, optical, or quantum computing device), that manipulates and transforms data represented as physical (e.g., electronic) quantities. The terms refer to actions and processes of the processing devices that manipulate or transform physical quantities within a system's components (e.g., registers, memories, other such information storage, transmission or display devices, etc.) into other data similarly represented as physical quantities within the same or other components.

The present invention facilitates robust dynamic revision of emulation application information. The present invention ensures that information consistency is maintained during emulation application information revision. In one embodiment, the present invention emulation application information revision system and method facilitates dynamic revision (e.g., updating) of Java class definitions. The revision is performed in a manner that maintains processing information results and permits resumption of processing at a state when the revision is initiated.

FIG. 1A is a flow chart of emulation class revision method 10, an emulation class revision method in accordance with one embodiment of the present invention. Emulation class revision method 10 facilitates dynamic revision of emulation class information (e.g., "on the fly"). Processing states prior to the revision are preserved and emulation virtual machine continues with new processing from the preserved state.

In step 11, an indication of an emulation application revision initiation is received. In one embodiment of the present invention, an emulation class revision is downloaded from an external source (e.g., the Internet) and when the downloading is complete a signal indicating initiation of an emulation application revision is sent to an emulation virtual machine (e.g., a Java virtual machine). For example, a Java virtual machine receives an event signal indicating a revision to Java classes loaded on the Java virtual machine has been received.

In step 12, a safe state (e.g., a consistent state) is established for performing revisions within an emulation virtual machine (e.g., a Java virtual machine). In one embodiment of the present invention, emulation virtual machine operations associated with the emulation application are permitted to reach a consistent or steady state and are halted. In one exemplary implementation, the emulation virtual machine checks if an emulation class associated with said emulation class revision is currently involved in a processing pipeline operation being performed by the emulation virtual machine. If a processing pipeline operation is already initiated, the emulation virtual machine permits that processing cycle to complete. However, the emulation virtual machine prevents processing pipeline operations to be initiated (e.g., fetched) by the emulation virtual machine on the classes associated with the class revision. For example, the emulation virtual machine does not permit processing pipeline fetch operations to commence while completing other processing pipeline operations (e.g., decode, execute, write, etc.).

In one embodiment, execution processing for other classes not associated with the emulation class revision are permitted to be initiated and completed. For example, the emulation virtual machine permit processing pipeline operations to commence (e.g., including fetch, decode, execute, etc.) for other processing pipeline operations not impacted by the revisions. Once the processing pipeline is empty (e.g., the other processing pipeline operations are completed), the emulation virtual machine proceeds to step 13.

Referring now to step 13 shown in FIG. 1A, an emulation class revision is performed. Shutting down the emulation virtual machine is not required due to the establishment of a consistent state in step 12. In one embodiment of the present invention, the current internal representation of the emulation application revisions is "flashed". The emulation class revision comprises revising an internal representation (e.g., a data structure) of the emulation class. In one exemplary implementation, the emulation class revision includes writing over existing information. The emulation class revision can include a comparison of the old version of a class definition and a revised version of a class and the old information associated with the revision is replaced with the new revised information and old information not associated with the revision is left alone.

In one embodiment of the present invention, performing the emulation class revision includes resolving corresponding dependency changes related to the emulation class revision. In one exemplary implementation resolving corresponding dependency changes comprises ascertaining which classes have a dependency relationship to the emulation class associated with the emulation class revision. Appropriate changes are determined for the classes which have a dependency relationship. Corresponding changes are implemented in the classes with a dependency relationship. For example, if a super class initially has a reference to a subclass and the subclass definition is deleted by the revision, the present invention can delete the reference to the subclass from the superclass even though the revision information did not explicitly include instructions to delete the reference to the subclass from the superclass. Additionally, a subclass can have a reference to a superclass that is deleted by a revision, the present invention can delete the reference to the superclass from the subclass and make appropriate changes to the subclass even though the revision information did not explicitly include instructions to delete the reference to the superclass from the subclass.

In reference still to FIG. 1A, emulation virtual machine operations are resumed in step 14. In one embodiment of the present invention, application information saved in step 12 is reloaded and processing with the revisions included proceeds from a consistent state established in step 12.

Figure 1B:
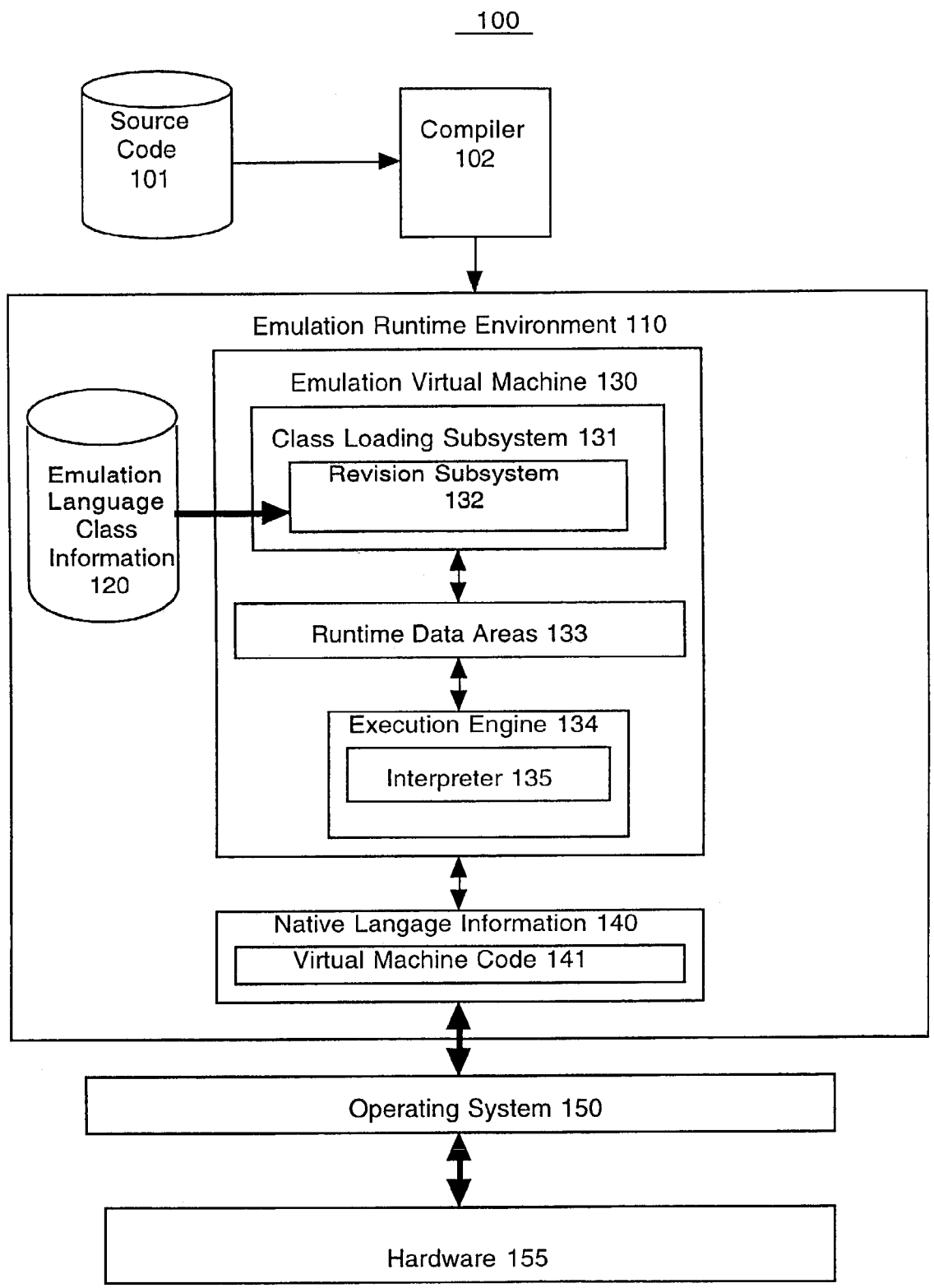

FIG. 1B is a block diagram representation of a present invention emulation application revision architecture 100 in accordance with one embodiment of the present invention. In one exemplary implementation, emulation application revision architecture 100 emulates a Java compatible architecture. Emulation application system 100 comprises source code 101, compiler 102, emulation revision architecture runtime environment 110, operating system 150 and hardware 155. The components of emulation application revision architecture 100 cooperatively operate to run an emulation application (e.g., a Java application) including dynamic revision of emulation application information (e.g., "on the fly"). Source code 101 includes application instructions (e.g., instructions associated with a Java application). Compiler 102 compiles or translates source code 101 into bytecode and/or object code that is utilized in emulation application revision runtime environment 110. Emulation application revision runtime environment 110 emulates a processing platform (or "machine") for performing emulation program instructions including revising emulation application information for execution on operating system 150 and hardware 155. Operating system 150 controls the utilization of hardware 155. Hardware 155 includes physical components that perform information manipulations specified by emulation application revision runtime environment 110.

In one embodiment of the present invention, emulation verification runtime environment 110 includes emulation language class information 120 (e.g., Java class information), emulation revision virtual machine 130 (e.g., a Java virtual machine with present invention emulation application information revision capabilities) and native language information 140. Emulation revision virtual machine 130 provides a platform-independent instruction execution "mechanism" for abstracting and coordinating operating system and processor instructions in a manner that provides emulation processing and dynamic revision of emulation application information. In one embodiment, emulation language class information 120 comprises bytecodes (e.g., code capable of running on multiple platforms) that provide instructions and data for execution and processing by emulation revision virtual machine 130. In one exemplary implementation, emulation class information 120 includes emulation application revision information. Native language information 140 includes native language instructions that are passed by emulation revision virtual machine 130 to operating system 150 and hardware 155.

In reference still to FIG. 1B, emulation revision virtual machine 130 comprises class loading subsystem 131, runtime data area 133 and execution engine 134 in one embodiment. Emulation revision virtual machine 130 is able to execute bytecodes and can use a variety of techniques to execute the bytecodes in software and/or varying degrees of hardware. Class loading subsystem 131 loads bytecodes included in emulation language class information 120 (e.g., Java bytecode information), including emulation application revision information (e.g., revised Java bytecode information). Runtime data area 133 defines and tracks assignment of logical memory locations associated with executing methods and processing data of loaded classes. Execution engine 134 (e.g., an execution module) provides a "mechanism" for executing instructions and processing data included in bytecodes of loaded classes.

Class loading subsystem 131 places emulation application revision information into memory (e.g., runtime data area 133) for processing. In one embodiment of the present invention, class loading subsystem 131 includes a revision loading subsystem 132 dynamically loads emulation application revision information on emulation verification virtual machine 130. In one exemplary implementation of the present invention, revision loading subsystem 131 includes a plurality of class loaders configured in a flexible call loader architecture that permits a Java application to load classes in a customized manner. When the class data and instructions are loaded, revision loading subsystem 131 transfers control for processing and execution of the data and instructions to runtime data area 133 and execution engine 134.

Runtime data area 133 can be flexibly adapted to a variety of different memory constraints. In one embodiment, each instance of emulation virtual machine 130 has a method area and a heap area which can be shared by multiple threads running inside the emulation virtual machine 130. When emulation virtual machine 130 loads class file information, it parses type information from the binary data contained in the class file and places this type information into a method location of runtime data area 133. As an emulation language program (e.g., Java program) proceeds, emulation virtual machine 130 places objects the emulation language program instantiates onto a heap location of runtime data area 133. Runtime data area 133 can include a stack area (e.g., a Java stack, a native language stack, etc.) which stores the state of method invocations. Runtime data area 133 can also include a program counter "register" area for indicating the next instruction of the emulation language program to execute.

Referring still to the exemplary illustration of FIG. 1B, execution engine 134 executes bytecode instructions included in emulation class information 120. In one exemplary implementation, each bytecode instruction includes an opcode that indicates the operation to be performed and can include an operand that provides information associated with the operation. Execution engine 134 fetches an opcode and related information (e.g., operands and/or data stored in other areas) and performs the instructions indicated by the opcode. In one embodiment of the present invention, execution engine 134 includes an interpreter 135. Interpreter 135 interprets the emulation program bytecode (e.g., Java program) information and retrieves native language information (e.g., native language instructions). The interpreted bytecode activity can be monitored and more heavily utilized bytecodes can be adaptively optimized. In one exemplary implementation, execution engine 134 interprets the bytecode information one instruction at a time. In an another exemplary implementation, a just-in-time compiler compiles the bytecode information into a native language machine code the first time a method is invoked and stores the native language machine code in cache, permitting faster execution and thereby mitigating some performance detractions (e.g., slower processing) otherwise associated with virtual machines.

Figure 2:
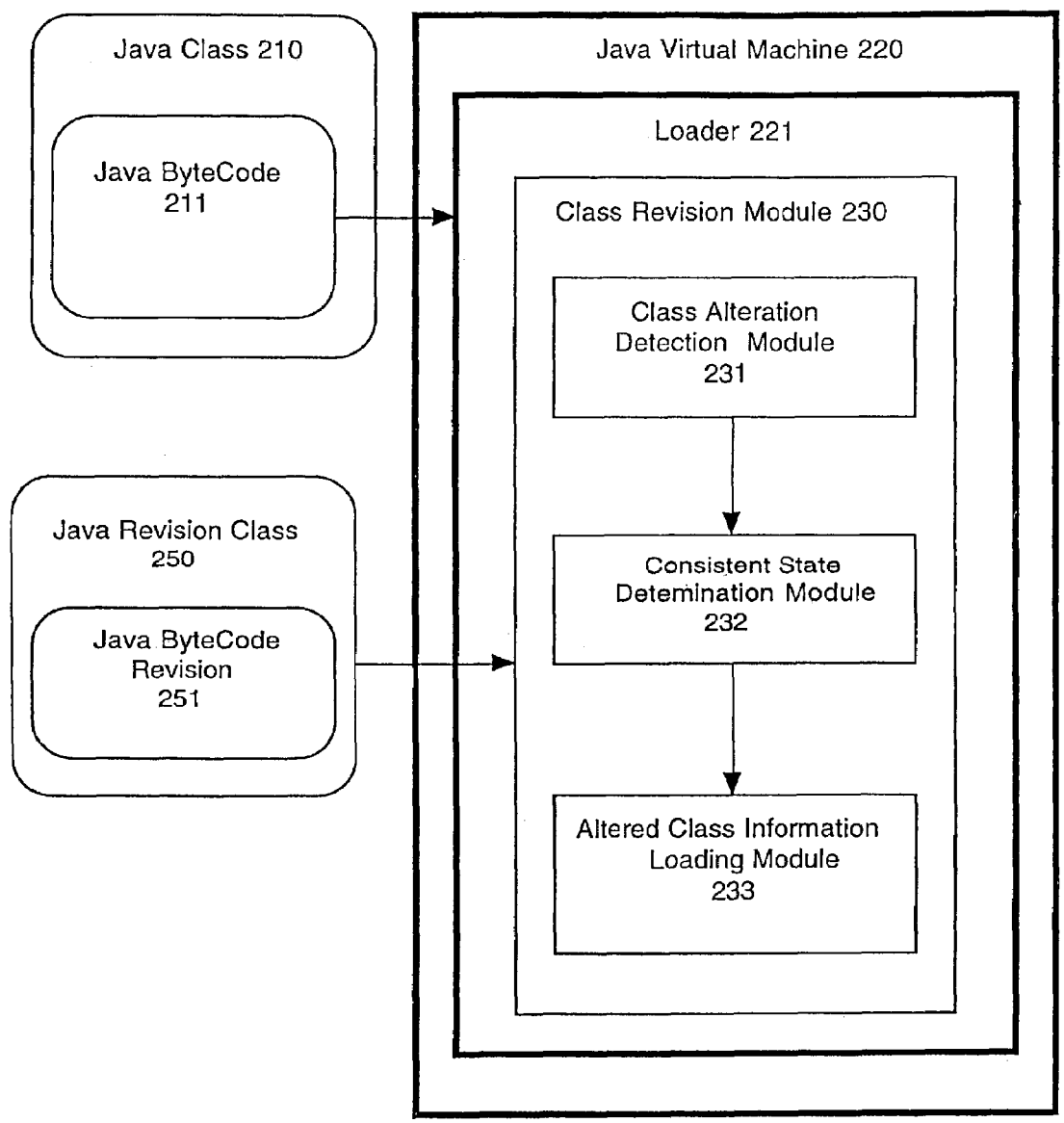
FIG. 2 is a block diagram of an exemplary Java emulation revision system in accordance with one embodiment of the present invention.

FIG. 2 is a block diagram of Java emulation revision system 200, one embodiment of the present invention. In one embodiment of the present invention, instructions for causing a computer system to implement a dynamic emulation class revision by Java emulation revision system 200 are stored and embodied on a computer usable storage medium (e.g., as computer readable code). Java emulation revision system 200 includes Java class 210, Java revision class 250 and Java virtual machine 220. Java class 210 comprises Java bytecode 211 and Java Revision Class 250 includes Java ByteCode revision 251. Java virtual machine 220 comprises loader 221 which includes Java class revision module 230.

In one embodiment of the present invention, Java class 210 is a code segment that includes Java bytecode 211 and Java revision class 250 is a code segment that includes Java revision bytecode 251. Java class 210 and Java class 250 define objects which are instances of a class (e.g., "component" characteristics or features included in the class). The Java class definitions can include fields and methods. The fields or class variables ("variables") can include data (e.g., integers or characters) which can be private data accessible by a single class or public data accessible by a plurality of classes. The data can also be characterized as static data associated with class objects as a whole (e.g., common to each instance of the class) or dynamic data associated with class objects individually. The methods perform tasks or functions (e.g., a subroutine). The methods can also call other methods via invocations and/or can pass data to other objects.

With continued reference to FIG. 2, the components of Java emulation revision system 200 cooperatively operate to dynamically incorporate emulation application revision information. Loader 221 loads files from Java class 210 and Java revision class 250. Class revision module 230 facilitates revision of class emulation application information (e.g., Java revision class 250) on the fly. In one exemplary implementation, class revision module 230 pauses Java virtual machine 220 operations at a consistent state, dynamically implements revisions included in Java revision class 250, and resumes Java virtual machine 220 processing from the consistent state values.

In one embodiment, class revision module 230 includes class revision detection module 231, consistent state determination module 232 and altered class information loading module 233. Class alteration detection module 231 detects an alteration to emulation class information. Consistent state determination module 232 determines if a consistent state exists. Altered class information loading module 233 loads altered emulation class information. In one exemplary implementation, class revision detection module 231, consistent state determination module 232 and altered class information loading module 233 are Java compatible (e.g., Java virtual machine specification compatible, Java language compatible, Java bytecode compatible, etc.). Consistent state determination module 232 can include instructions for storing emulation application information when a consistent state is established.

In one exemplary implementation, altered class information loading module 233 includes a related information analysis module (not shown). The related information analysis module ascertains if related emulation application information is impacted by the altered emulation class information and makes corresponding alterations to the related emulation application information. For example, the related information analysis module determines if the revisions implemented by Java virtual machine 220 are involved in dependency relationships. If there is involvement with a dependency relationship, the related information analysis module makes appropriate changes to other classes (e.g., also involved in the dependency relationship) to maintain the dependency relationships. The corresponding alterations can include changing dependency information included in the related emulation application information (e.g., a Java class with a superclass or subclass relationship to a revised Java class).

Figure 3A:
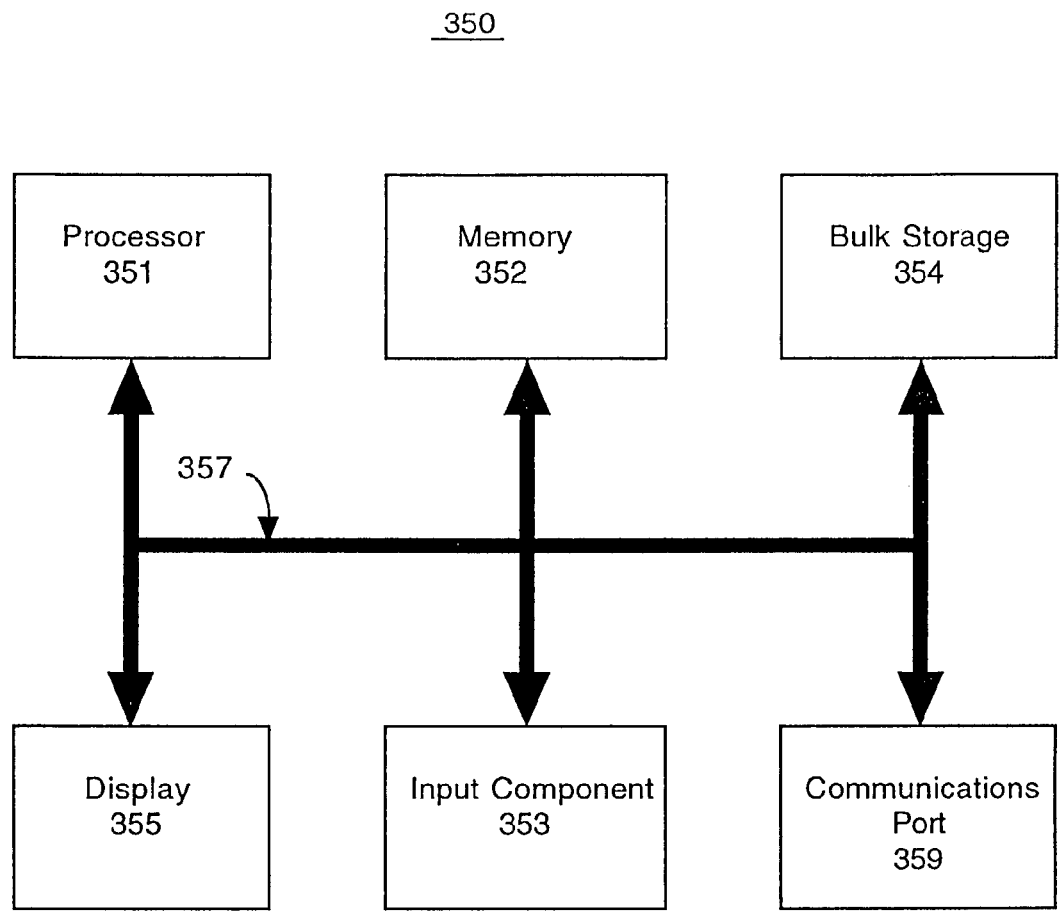
FIG. 3A is a block diagram of one embodiment of a computer system on which the present invention can be implemented.

FIG. 3A is a block diagram of computer system 350, one embodiment of a computer system on which the present invention may be implemented. For example, computer system 350 can be utilized to implement emulation application revision architecture 100 and Java emulation revision system 200. Computer system 350 includes communication bus 357, processor 351, memory 352, input component 353, bulk storage component 354 (e.g., a disk drive), network communication port 357 and display module 355. Communication bus 357 is coupled to central processor 351, memory 352, input component 353, bulk storage component 354, network communication port 357 and display module 355. The components of computer system 350 cooperatively function to provide a variety of functions, including performing emulation application revision in accordance with the present invention. Communication bus 307 communicates information. Processor 351 processes information and instructions, including instructions for dynamic emulation class revision (e.g., Java class revisions). Memory 352 stores information and instructions, including for dynamic emulation class revisions. Bulk storage component 354 also provides storage of information. Input component 353 facilitates communication of information to computer system 350. Display module 355 displays information to a user. Network communication port 357 provides a communication port for communicatively coupling with a network.

Figure 3B:
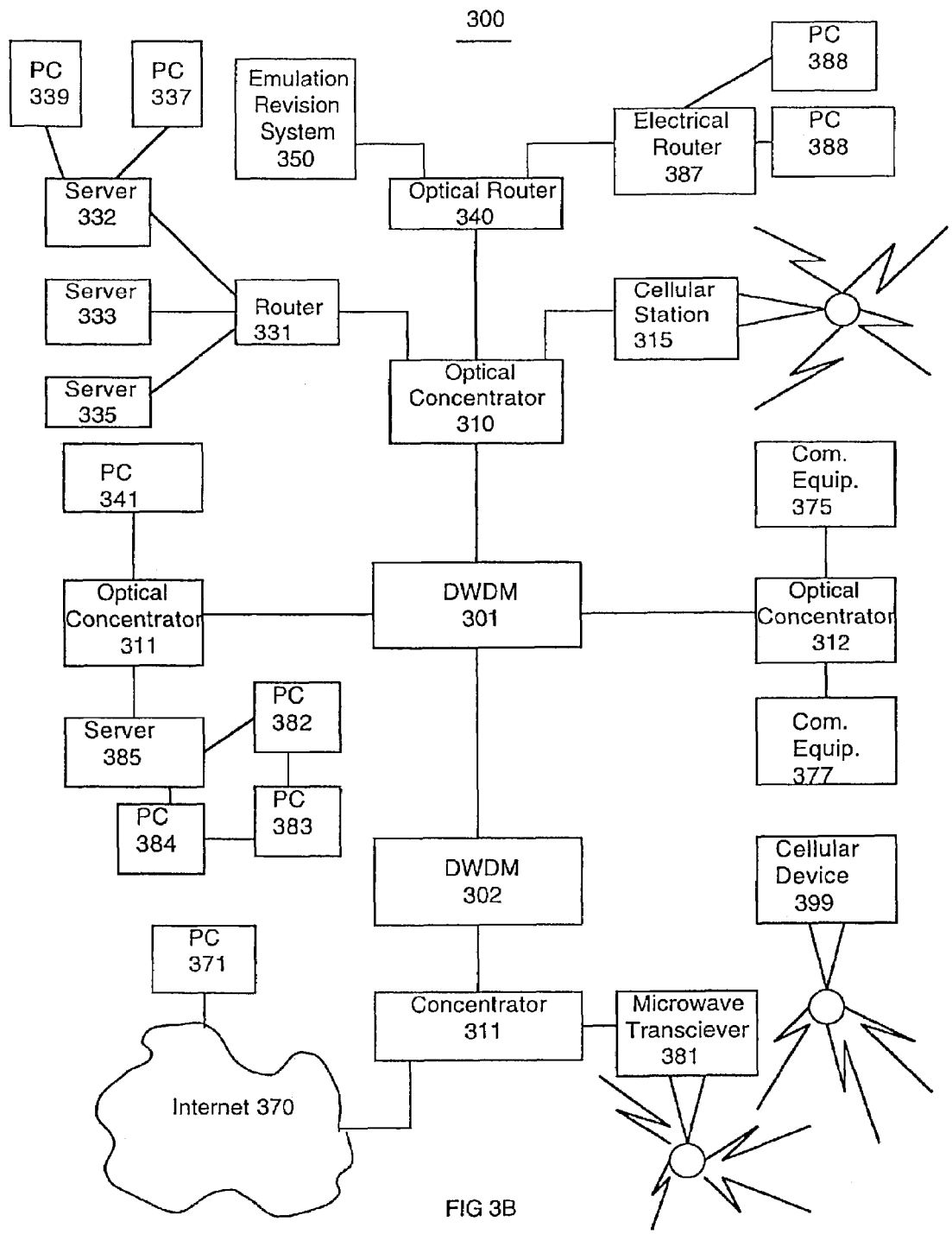
FIG. 3B is a block diagram of an exemplary communication network for communicating emulation application revision information in accordance with one embodiment of the present invention.

In one embodiment, the present invention is implemented on devices (a computer system, embedded devices, etc.) connected via a communication network. FIG. 3B is a block diagram of communication network 300, one exemplary communication network in accordance with the present invention. In one embodiment of the present invention, emulation application revision information is communicated via communications network 300. Communication network 300 comprises computer system 350 for providing dynamic emulation class revision, dense wave division multiplexer (DWDM) 301 and 302, optical concentrators 310, 311, 312 and 317, routers 331, 340 and 387, cellular station 315, cellular device (e.g., phone, handheld computer, etc.) 399, microwave transceiver 381, Internet 370, servers 385, 332, 333 and 335, personal computers 337, 339, 341, 371, 382, 383, 384, 388 and 389, and miscellaneous communication equipment 375 and 377. The components of communications network 300 communicate with each other over a variety of architectures utilizing numerous communication protocols. One exemplary implementation of communications network 300 utilizes Fiber Distributed Data Interface (FDDI), Dynamic Packet Transport (DPT), Packet Over Sonet (POS), Asynchronous Transfer Mode (ATM), Ethernet, token ring, Transmission Control Protocol/Internet Protocol (TCP/IP), plain old telephone system (POTS), Cable, Digital Subscriber Line (DSL), etc.

Thus, the present invention facilitates efficient dynamic emulation application information revision. Systems and methods of the present invention enable emulation class alterations to be implemented on the fly without shutting down an emulation virtual machine engaged in processing associated with the emulation application information revisions. The present invention also enables processing to resume at a point or state at which the emulation class revisions are initiated. For example, Java virtual machine processing threads can continue from a point at which Java class revisions are introduced. The present invention includes features for ensuring data consistency is maintained throughout the revision process. The present invention also includes features to ensure that programming dependency relations are maintained and appropriate adjustments to superclasses and subclasses are implemented to reflect changes included in the emulation application revisions.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various modifications as are suited to the particular use contemplated. It is intended that the scope of the invention be defined by the Claims appended hereto and their equivalents.

What is claimed is:

1. An emulation class revision process comprising:
    receiving an indication of an initiation of a revision to an emulation class;
    establishing a safe state within an emulation virtual machine for performing said emulation class revision, said emulation virtual machine selectively preventing processing pipeline operations related to an emulation class of said emulation class revision, such that a non-initiated processing pipeline operation associated with said emulation class revision is prevented from being initiated; an already initiated processing pipeline operation associated with said emulation class revision is permitted to be completed; and a processing pipeline operation not associated with said emulation class revision is permitted to be initiated and completed, wherein said safe state retains prior processing results; and
    performing said emulation class revision such that shutting down said emulation virtual machine is not required, wherein said revision comprises revising a data structure that is an internal representation of an emulation class.

2. An emulation class revision process of claim 1 wherein said establishing said safe state for performing said emulation class revision comprises:
    checking if said emulation class associated with said emulation class revision is currently involved in a processing pipeline operations being performed by said virtual machine;
    permitting said processing pipeline operations to be completed if already initiated on said class associated with said class revision; and
    preventing processing pipeline operations from being initiated by said virtual machine on said class associated with said class revision.

3. An emulation class revision process of claim 1 wherein said performing said emulation class revision comprises revising said internal representation of said emulation class.

4. An emulation class revision process of claim 1 wherein said performing said emulation class revision includes writing over existing information.

5. An emulation class revision process of claim 1 wherein said performing emulation class revision comprises replacing old information with new information.

6. An emulation class revision process of claim 1 wherein said performing said emulation class revision comprises resolving corresponding dependency changes related to said emulation class revision.

7. An emulation class revision process of claim 6 wherein said resolving corresponding dependency changes related to said emulation class revision comprises:
    ascertaining which classes have a dependency relationship to said emulation class associated with said emulation class revision;
    determining appropriate changes to maintain said dependency relationship; and
    implementing said changes to said classes which have said dependency relationship to said emulation class associated with said emulation class revision.

8. An object oriented emulation system comprising:
    means for communicating information;
    means for processing said information, including instructions for dynamically revising emulation application information, said instructions selectively preventing processing pipeline operations, such that a non-initiated processing pipeline operation associated with said dynamically revising emulation application information is prevented from being initiated; an initiated processing pipeline operation associated with said dynamically revising emulation application information is permitted to be completed; and a processing pipeline operation that is not associated with said dynamically revising emulation application information is permitted to be initiated and completed, said means for processing said information coupled to said means for communicating said information; and
    means for storing said information, including said instructions for dynamically revising emulation application information, said means for storing said information coupled to said means for communicating information, wherein said revising of said emulation application information comprises revising a data structure that is an internal representation of an emulation class associated with said information.

9. An object oriented emulation system of claim 8 wherein said means for processing performs an emulation class revision method.

10. An object oriented emulation system of claim 8 wherein said emulation application revision information includes a new class definition.

11. An object oriented emulation system of claim 8 wherein said instructions for dynamically revising emulation application information include instructions for determining and implementing superclasses and subclass changes associated with revised emulation application information.

12. An object oriented emulation system of claim 8 wherein said means for communicating is coupled to a network and said emulation application revision information is communicated via said network.

13. An object oriented emulation system of claim 8 wherein said means for processing emulates an object oriented virtual machine.

14. A computer usable storage medium having computer readable program code embodied therein for causing a computer system to implement dynamic emulation class revision instructions comprising:
   a class alteration detection module for detecting an alteration to emulation class information;
   consistent state determination module for determining if a consistent state exists, an emulation virtual machine selectively preventing a non-initiated instruction from an emulation application that includes revised class information to enter a virtual machine pipeline associated with said class to be revised, selectively allowing an instruction already initiated into said virtual machine pipeline associated with said class to be revised to be completed; and permitting a processing pipeline operation not associated with said class to be revised to be initiated and completed; and
   an altered class information loading module for loading altered emulation class information, wherein said alteration comprises altering a data structure that is an internal representation of an emulation class associated with said emulation class information.

15. A computer usable storage medium of claim 14 wherein said class revision detection module, said consistent state determination module and said altered class information emulation class loading module are compatible with an object oriented emulation language.

16. A computer usable storage medium of claim 14 further comprising a related information analysis module for ascertaining related emulation application information impacted by said altered emulation class information.

17. A computer usable storage medium of claim 16 wherein related information analysis module makes corresponding alterations to said related emulation application information.

18. A computer usable storage medium of claim 17 wherein said corresponding alterations includes changing dependency information included in said related emulation application information.

19. A computer usable storage medium of claim 18 wherein said consistent state determination module includes instructions for storing emulation application information when a consistent state is established.

* * * * *